United States Patent [19]

Basel et al.

[11] 4,369,197
[45] Jan. 18, 1983

[54] BULK PRESERVATIVE STORAGE OF HORTICULTURAL CROPS AND PIGMENTS PRODUCED FROM GREEN HORTICULTURAL CROPS

[75] Inventors: Richard M. Basel, Bradner; Wilbur A. Gould, Worthington, both of Ohio

[73] Assignee: Ohio Agricultural Research & Development Center, Wooster, Ohio

[21] Appl. No.: 229,176

[22] Filed: Jan. 28, 1981

Related U.S. Application Data

[63] Continuation-in-part of Ser. No. 115,393, Jan. 25, 1980, abandoned.

[51] Int. Cl.³ .................... A23B 7/10; A23L 1/212
[52] U.S. Cl. ............................ 426/270; 426/321; 426/331; 426/615; 426/655; 426/419; 426/540
[58] Field of Search ............ 426/321, 310, 331, 430, 426/418, 419, 262, 270, 615, 629, 637, 655, 521, 540, 250, 251; 106/288 Q; 8/637, 646, 438

[56] References Cited

U.S. PATENT DOCUMENTS

| 770,658 | 9/1904 | Sandman et al. | 99/155 |
|---|---|---|---|
| 3,101,271 | 8/1963 | Croall | 99/154 |
| 3,305,366 | 2/1967 | Sutton et al. | 99/154 |
| 3,366,488 | 1/1968 | Wagner et al. | 99/105 |
| 3,366,489 | 1/1968 | Wagner et al. | 99/105 |
| 3,366,490 | 1/1968 | Wagner et al. | 99/105 |
| 3,764,348 | 10/1973 | Huxsoll et al. | 426/310 |
| 3,873,753 | 3/1975 | Nelson et al. | 426/373 |
| 3,978,235 | 8/1976 | Schiro | 426/335 |
| 4,250,197 | 2/1981 | Koch | 426/540 |

FOREIGN PATENT DOCUMENTS

| 2007463 | 9/1971 | Fed. Rep. of Germany . | |
| 2226123 | 11/1971 | France . | |
| 266117 | 7/1970 | U.S.S.R. | 426/250 |

*Primary Examiner*—Raymond N. Jones
*Assistant Examiner*—Elizabeth J. Curtin
*Attorney, Agent, or Firm*—Millard & Cox

[57] ABSTRACT

Horticultural crops may be stored in an acidic aqueous liquor at a temperature not exceeding about room temperature wherein the pH of the liquor is sufficiently low and the storage conditions are adequately starved of molecular oxygen to retard spoilage of the stored product. Following termination of the storage, the stored product is preferably at least partially neutralized at a temperature of between about 40° and 60° F. with a neutralizing agent to raise the pH of the stored product. When green horticultural crops are thus stored and thereafter boiled, a strong green coloration is produced and green pigments can be separated by solvent extraction.

38 Claims, 12 Drawing Figures

THE EFFECT OF TEMP. ON THE TCM VALUE OF TOMATO JUICE

THE EFFECT OF ppm OXYGEN IN TOMATO JUICE ON THE TCM VALUE AT VARIOUS TEMPS.

BULK PRESERVATIVE STORAGE OF HORTICULTURAL CROPS AND PIGMENTS PRODUCED FROM GREEN HORTICULTURAL CROPS

This application is a continuation-in-part of our application 115,393 filed Jan. 25, 1980 and expressly abandoned Apr. 28, 1981.

BACKGROUND OF THE INVENTION

The present invention relates to the storage of horticultural crops and more particularly to the bulk preservative storage of such crops even in as-picked form. The invention also relates to pigments which can be produced in such storage. Horticultural crops or products for purposes of this invention preferably are edible and include fruits and vegetables. Exemplary horticultural crops include, for example, tomatoes, carrots, peas, corn, beans, potatoes, turnips, asparagus, apples, pears, peaches, avocados, and the like. Thus, the term "horticultural crops" is to be interpreted liberally according to the present invention. One method for storing such crops intended for consumer use in as-picked form involves refrigeration of the crops. Other crops, such as tomatoes, for example, can be processed into a paste or puree and bulk stored prior to ultimate processing. Unfortunately, extended storage times are not possible for the first method and the second method is especially limited in that following storage the processor is limited in the kinds of products that can be made from the puree. Also, such stored crops are susceptible to spoilage even under carefully controlled refrigeration conditions.

The present invention permits the preservative bulk storage of horticultural crops even in as-picked form as well as in a processed form. Such crops following termination of their storage retain their taste, color, and integrity quite remarkably. Also, the nutritional content of such crops is substantially retained.

SUMMARY OF THE INVENTION

The present invention provides a method for the preservative storage of an edible horticultural product. Such method comprises storing said product in an acidic aqueous liquor at a temperature not exceeding about room temperature. The pH of the liquor is not greater than about 2 and its molecular oxygen concentration does not exceed about 100 parts per million; this serves to retard spoilage of the stored product. At the termination of the storage time period, the stored product is at least partially neutralized with a neutralizing agent to raise the pH of the stored product to an acceptable level for use of said stored product.

The present invention also extends to two green pigments which can be produced using the storage method of the invention. One of these pigments is copper-free, while the other contains copper. Both pigments are derived from chlorophyll present when green edible horticultural products are stored by the method of the invention. Although the exact chemical constitution of the pigments is not known, they may be characterized by their solubility, chromatographic and spectroscopic properties.

The copper-free pigment of the invention is more soluble in ether than in acetone, has an $R_f$ value of about 0.0286 when developed with a 74% methanol:20% acetone:6% water mixture saturated with soybean oil using microcrystalline cellulose reversed phase thin layer chromatography and has the following spectroscopic characteristics:

(a) visible peaks in petroleum ether solution at about 410 and about 665 nm;
(b) infra-red peaks at about 2920, about 2850, about 1710, about 1460 and about 1375 cm$^{-1}$, and
(c) nuclear magnetic resonance peaks in 100% deuterochloroform at about $-3.521$, about 7.260 and about 5,363 parts per million relative to tetramethylsilane.

The copper-containing pigment of the invention is paramagnetic, more soluble in ether than in acetone, stable to boiling 20% hydrochloric acid and 5% aqueous sodium hydroxide solution, has an $R_f$ value of about 0.0091 when developed with a 74% methanol:20% acetone:6% water mixture saturated with soybean oil using microcrystalline cellulose reversed phase thin layer chromatography and has the following spectroscopic characteristics:

(a) visible peaks in petroleum ether solution at about 420 and about 644 nm;
(b) infra-red peaks at about 2920, about 2850, about 1710, about 1460 and about 1410 cm$^{-1}$;
(c) nuclear magnetic resonance peaks in 100% deuterochloroform at about $-3.521$, about 7.260 and about 5.359 parts per million relative to tetramethylsilane; and
(d) electron spin resonance at about 3222 G at 77° K. in pyridine.

DETAILED DESCRIPTION OF THE INVENTION

Depending upon the ultimate processed form of the crop following termination of the storage, it can be very important that the stored crop retain its taste (not pick up an off-flavor), retain its color, retain its integrity and texture, and retain its nutritional values. For some uses, only a few of these features need be retained. In still other processed forms of the stored crops, especially if the crop is to be processed to a drastically different form from the form in which it was stored, such crop attributes can be relatively unimportant. Such processed forms include the use of the crop as an additive or as a base stock to which other ingredients added will control the flavor, color, and the like of the ultimate mixture. The present invention has the flexibility and capability of retaining the taste, color, integrity and texture, and nutritional values of the stored product if such is desired. Under other circumstances, such attributes of the crop can be somewhat sacrificed and the overall storage costs decreased thereby. In any event, such horticultural crops can be stored in bulk for extended time periods of up to a year and longer and be totally preserved during such storage in relatively efficient and economic fashion.

The crop or product is stored in an acidic aqueous liquor. The water can come from the product's own juice or can be water added to the crop, or combinations thereof. Since the horticultural crops are edible, the acid used to form the acidic aqueous liquor should be a food grade acid (i.e. an acid permitted to come in contact with food as regulated and determined by the Food and Drug Administration or other applicable authority) and preferably such acid has a low $pK_a$ in order to economize on the proportion of acid required in forming the liquor. The preferred acid is hydrochloric acid alone or in combination with other acids, especially organic acids such as, for example, gluconic acid, malic acid, tartaric acid, lactic acid, acetic acid, citric acid, and the like and mixtures thereof. Suitable inorganic acids include, for example, sulfuric acid, phosphoric acids (e.g. pyrophosphoric acid), and the like and mixtures of any of the acids listed herein. While organic acids may be used alone for forming the acidic aqueous liquor, generally more of such acid will be required which contributes to higher storage costs of the stored crops. It should be recognized, however, that for differing products, different pHs will be required to be established in order to retard spoilage of the stored crop and, thus, weaker organic acids may be preferred under such circumstances. Further, some acids may exhibit antimicrobial activity and, thus, their use alone may permit acidification to a higher pH value than the pH value required when using HCl alone. Relatively low pH's are established for the acidic aqueous liquor in order to inhibit yeast and bacteria growth in the liquor under storage for prevention of the crop from spoiling. In all cases, the pH of the liquor is not greater than about 2, and preferably not greater than about 1.60, but the optimum pH varies according to the product being stored; for example, the optimum pH for storage of cucumbers is about 1.55. Many products are desirably stored at a pH not greater than about 1.40; for example, with tomatoes as the horticultural crop to be stored, a pH of 1.0 to 1.35 has been determined to be advantageous and preferably a pH of 1.25–1.35. With such a low pH required for such acidic aqueous liquor in the storage of tomatoes, obviously a strong acid with a low $pK_a$ will be preferred in order to economize on the proportion of acid required. As stated above, with other products and depending on their natural pH and their susceptibility to spoilage, differing pH ranges will be required. Another advantage of HCl is that when the stored product, following termination of storage is neutralized, a by-product salt (for example, with sodium hydroxide neutralizing agent) can be formed; however, such salt normally is added to most horticultural crops for flavoring during processing anyway. Also, it should be understood that the salt concentration in the stored product can be controlled by leaching, dilution, or other technique.

In order to inhibit fungus (mold) growth in the stored product and liquor, the molecular oxygen concentration in the liquor is established and maintained not exceeding 100 p.p.m. and preferably not exceeding about 25 p.p.m. so that the fungus growth is inhibited. An additional benefit of maintaining low molecular oxygen presence is the suppression of color deterioration, vitamin C degradation, and the like of the stored product. Further, mold growth only occurs under bulk storage conditions fairly high in oxygen concentration and will proceed until the oxygen is depleted or until the pH of the product is sufficiently high that yeast growth additionally may occur. For safety, the molecular oxygen concentration should not exceed about 10 p.p.m.

For different horticultural crops, different proportions of molecular oxygen can be tolerated as dissolved oxygen in the aqueous liquor, oxygen content in the stored crop, gaseous oxygen in contact with the liquor, and from other sources which can contain the oxygen. For example, some products may be required to be blanched (for example apples) and desirably the water which forms the acidic aqueous liquor can be deaerated prior to its addition to the crop. Preferably, the gaseous atmosphere in contact with the liquor under storage conditions can be maintained as a vacuum (e.g. of from as low as 1 to 10 millimeters of mercury) or can be an inert gas such as nitrogen, carbon dioxide, or the like. Again, depending on the particular stored product and its susceptibility to fungus growth, different oxygen levels can be tolerated during the storage.

The storage temperature desirably should not exceed about indoor room temperature (about 70°–85° F.) and lower temperatures of around 40°–60° F. only improve the product during its storage by aiding in inhibiting spoilage and sugar degradation of the product. It should be emphasized, however, that refrigeration of the stored product is not ordinarily necessary. Such room temperature storage conditions certainly contribute to the economy of the storage process. While other factors must be taken into consideration during the storage of the crop, the crop can be preserved during the storage by adjusting and maintaining the pH of the aqueous liquor and the level of oxygen permitted in the system during the storage.

Work on the present invention has shown that lycopene and other carotenoids are subject to oxygen degradation in the process, but that little degradation is exerted by the storage temperature of the product. With oxygen levels of around 25 ppm, a slight visual effect (i.e. yellowing) of stored tomatoes has been observed. At oxygen levels of less than about 10 ppm, no visual color change was observed. Additionally, Vitamin C degradation has been found to be dependent both on the oxygen level of the stored product as well as the storage temperature of the product. Thus, lower storage temperatures within the indicated range of temperatures useful for the process is preferred for minimizing Vitamin C degradation. Note, that any ascorbic acid addition to the product should follow termination of the crop storage in order to preclude its degradation. Fructose and similar pentose sugars undergo degradation by a caramelization-like decomposition mechanism at higher temperatures. Oxygen apparently initiates little of this type of degradation of fructose. Accordingly, lower storage temperatures will aid in inhibiting this fructose degradation which imparts an off-flavor and off-color to the product. Dextrose and similar sugars apparently are not sensitive to either oxygen or temperature induced degradation in the process. Thus, the foregoing means that advantageously the oxygen level established and maintained in the process should not substantially exceed about 25 ppm and preferably not substantially exceed about 10 ppm. Storage temperatures advantageously should be between about 40° and 60° F. for minimizing any temperature-induced degradation. Note, that the indicated oxygen levels also are adequate for inhibiting mold growth.

With bulk storage of products there can be some crushing of the product especially toward the bottom. The amount of crushing is a function of the type of product being bulk stored. One easy method for minimizing such crushing is to control the density of the acidic aqueous liquor to be about the same as the density (specific gravity) of the product or slightly higher in density than the product. Under such density controlled bulk storage, the product will tend to be suspended or buoyed in the liquor and, thus, crushing of the product will be minimized. An easy way to increase the density of the liquor is by the addition of a salt or the like to the liquor, though a variety of other methods can be employed.

As mentioned above, the present invention has many benefits. One benefit is that no refrigeration of the stored product is required. Another benefit is that the crop can be put into immediate bulk storage in its as-picked form for later use without the necessity of scheduling harvesting times to plant capacity. Heretofore, perishable products (such as, for example, tomatoes intended for processing into juice, puree, canned whole and sliced peeled tomatoes, etc.) had to be immediately processed after harvesting or bulk refrigerated stored so that no spoilage of the product occurred. Predominantly, tomatoes are pureed and stored in such liquefied form which necessitates large processing and storage facilities especially for climates which have a restricted harvesting season. With the present invention, however, such products can be bulk stored in whole form which gives new dimensions of flexibility to processors since they can decide the ultimate processed form of the products much later in time depending upon, for example, consumer demand for different forms of the processed product. Also, perishable horticultural products can be harvested year round and bulk stored for processing at a later date. Storage times of up to a year and longer are quite within the capability of the present invention without any undue change in the flavor of the product following termination of storage. The present invention also permits bulk transport of perishable horticultural products at essentially room temperature which is highly advantageous.

Upon termination of storage of the product, the pH of the product should be raised preferably to the initial pH level which the product had prior to the acidic storage of the product. A variety of neutralizing agents or bases can be used. Preferably the neutralizing agent is an alkali metal or alkaline earth metal hydroxide, oxide, carbonate, bicarbonate, sesquicarbonate, or the like. Such neutralizing agents are advantageous because their addition to HCl acidic liquor causes a by-product salt to be formed along with water and/or carbon dioxide which by-products do not adversely affect the flavor or physical properties of the product. Of course, a variety of organic bases can be used, but their cost is not as attractive as the preferred bases.

Another aspect of the present invention is the ability to control the firmness of the stored product by judicious selection of the neutralizing agent. Polyvalent metal-containing neutralizing agents (most notably Ca) tend to increase the firmness of the stored product significantly while monovalent metal-containing neutralizing agents (e.g. Na) do not produce such effect. Calcium hydroxide is advantageous for increasing the firmness of the stored product, especially in the case of cucumbers. Alternatively, calcium or like metal in acid form may be used to acidify the product to be stored. Of course, varying combinations and proportions of the above-discussed bases may be used for firmness control. The addition of the base or neutralizing agent preferably is done at cooler temperatures of about 40°–70° F. and under agitation, though broadly temperatures of from about room temperature (e.g. 85° F.) to above freezing (e.g. 40° F.) can be used for this step of the process. Factors determinative in selecting the neutralization temperature include the rate of addition of the neutralizing agent (or rate of neutralization), the quality of the product desired, the type of product used, and like factors. The neutralizing agent can be added directly to the acidic aqueous liquor especially if the product is stored in its own juice or the storage water is required in later processing. Alternatively, the liquor can be drained off first for reuse and fresh water added to the product prior to the base addition. It should be noted that under extended times of storage, some self-peeling of the products, for example tomatoes, can occur so that the liquor drained from the product can be processed, optionally with reconcentration, to make use of the peels in the liquor and/or the liquor strained for recovery of the peels. It is preferred that the pH of the product be raised to its initial level, though higher and lower pHs can be acceptable depending upon the requirements of the product in its ultimate intended processed form.

In practicing the present invention, a variety of schemes are possible. For example, the crop in its as-picked form can be wahed and stored. The stored product also can be heated for enzyme inactivation and/or stabilization of complex carbohydrates such as pectin and then bulk stored. Following the termination of storage and neutralization of the stored product, the product can be used in such stored form or further processed. Equipment for storage of the product and appurtenant lines and equipment must be resistant to strong acid and preferably is constructed from or lined with acid-resistant materials such as, for example, polytetrafluoroethylene, plastic, glass or glass composites, and the like. Also, such materials desirably are approved for food use.

When storing green beans and wax beans, it is desirable to blanch the beans before storage since pectin tends to leach from the unbalanced beans during storage and gel on the surface of the beans.

While the invention has been particularly illustrated by tomatoes, it should be noted that work on the present invention revealed that phenomenal color retention is exhibited by green vegetables subjected to the bulk storage process of the present invention. Thus, horticultural crops which are green in color from chlorophyll are acidified, bulk stored, and neutralized, as described above. No special color retention is present at this stage of the process. Next, the stored green crops are subjected to a standard canning process wherein they are heated to boiling or higher temperature. Quite unexpectedly, the color of the crops is restored to a brilliant, fresh green color as if the crops were fresh-picked. Thus, the color retension has been confirmed for green beans, peas, spinach, and wax beans. In fact, conventional canned green beans have been subjected to the process and a significant color improvement obtained thereby.

As previously mentioned, two different pigments can be extracted from edible, chlorophyll-containing horticultural products subjected to the storage process of the invention and then boiled. If the solution, prior to boiling, is substantially free of copper, a copper-free pigment is produced. If, on the other hand, the solution, prior to boiling, contains dissolved copper (either because the original horticultural product or the acid liquor contains small amounts of copper or because copper is deliberately introduced into the solution), a copper-containing pigment is produced. It should be noted that only very small amounts of copper are needed to produce the copper-containing pigment in which the copper is bound very tightly. Even the trace amounts of copper which can be formed in water which has been standing for an extended period in copper pipes will cause formation of some copper-containing pigment. Accordingly, if it is desired to produce the copper-free pigment of the invention, great care should be taken to ensure that the edible horticultural products used and the liquor in which the product is stored are free from all traces of copper.

After the stored horticultural products have been stored and boiled, the pigments may be extracted therefrom with a non-polar solvent, preferably petroleum ether. If, however, the pigment is extracted directly from the stored products with a non-polar solvent, the pigment finally produced is not very pure. Accordingly, it is preferred to first extract the stored products with a semi-polar solvent, preferably acetone, and then to extract the resultant semi-polar solvent extract with a non-polar solvent, preferably petroleum ether. It is of course essential that the semi-polar and non-polar solvents chosen be substantially immiscible with one another. The non-polar solvent extract produced should be separated from the semi-polar solvent extract before the non-polar solvent is evaporated therefrom to produce the pure pigment.

The copper-containing pigment appears to be more stable than the copper-free one and is not apparently affected by boiling in 20% hydrochloric acid or 50% aqueous sodium hydroxide. Moreover, the copper-containing pigment is not appreciably oxidized in air after two months at room temperature. Both pigments are cheap to manufacture and both appear to be useful for coloring foodstuffs. Moreover, the great stability of the copper-containing pigment renders it useful for coloring materials other than foodstuffs; for example the copper-containing pigment might be used to color plastics green.

The following example is now given, though by way of illustration only, to show the improvement in the color of green vegetables subjected to this process and boiling and the extraction and properties of the copper-free and copper-containing green pigments produced therein.

EXAMPLE I

Samples of green vegetables (blanched green beans, conventionally canned green beans or blanched peas) were stored for three months in half their weight of acidified distilled water containing 30 ml. conc. HCl/l. distilled water. The acidified liquor was neutralized with aqueous sodium hydroxide and the vegetables sterilized for 40 minutes at 100° C. 40 Grams of each sample were then blended with 200 ml. of reagent grade acetone for one minute in a blender. The mixture was extracted for five minutes and gravity filtered using sharkskin paper. The filtrate was then added to 50 ml. of reagent grade light petroleum ether in a one liter separatory funnel and shaken for three minutes. At the end of this time, the green pigment was almost all extracted into the petroleum ether phase, while most of the yellow carotenoids remained in the acetone phase. The layers were separated and the petroleum ether layer was dried over a large quantity of anhydrous sodium sulfate, then vacuum evaporated to yield the pure pigment.

A small quantity of aqueous copper sulfate solution (any soluble cupric salt may be used) was added to half the samples immediately before the sterilization thereof; the addition of this copper sulfate may, of course, be omitted if analysis shows that the vegetables or the accompanying liquor already contain sufficient quantities of dissolved copper.

The pigment from each sample was then subjected to the following tests:

A. Sugar Column Chromatography

The homogeneity of the samples was tested by chromatography on a sugar column by the procedure set out in J. H. C. Smith and A. Benitez, Chlorophylls: Analysis in Plant Materials, Moderne Methoden Der Pflanzenanalyse, 4, 142–196 (1955).

B. Thin Layer Chromatography

The pigment was dissolved in light petroleum ether containing 7% soybean oil and spotted onto a microcrystalline cellulose plate, which was then subjected to reversed phase thin layer chromatography using a 74% methanol:20% acetone:6% water mixture saturated with soybean oil.

C. Visible Spectra

Figure 1:
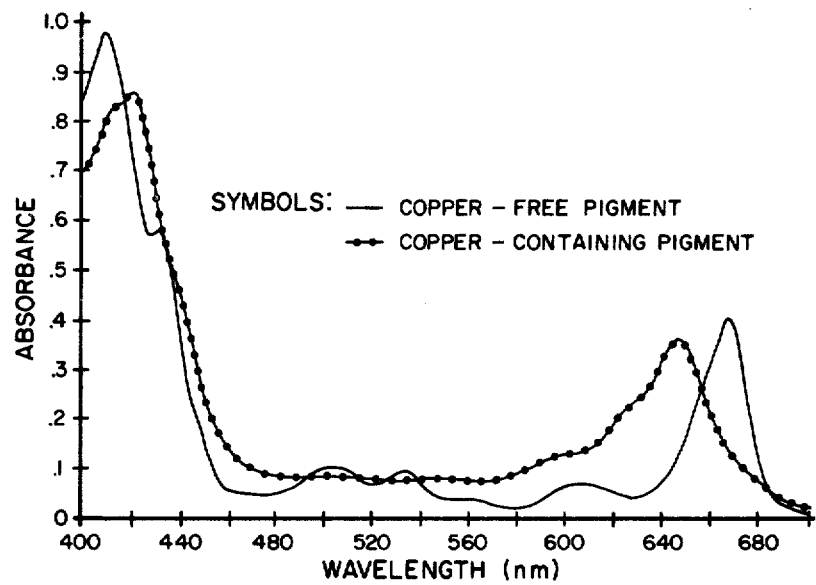
FIG. 1 shows the visible spectra of the copper-free and copper-containing pigments of the invention.

Visible spectra were taken using a visible spectrophotometer using pigment dissolved in petroleum ether in one cm. quartz cells and a petroleum ether reference. The resulting spectra are shown in FIG. 1.

D. Infrared Spectra

Figure 2:
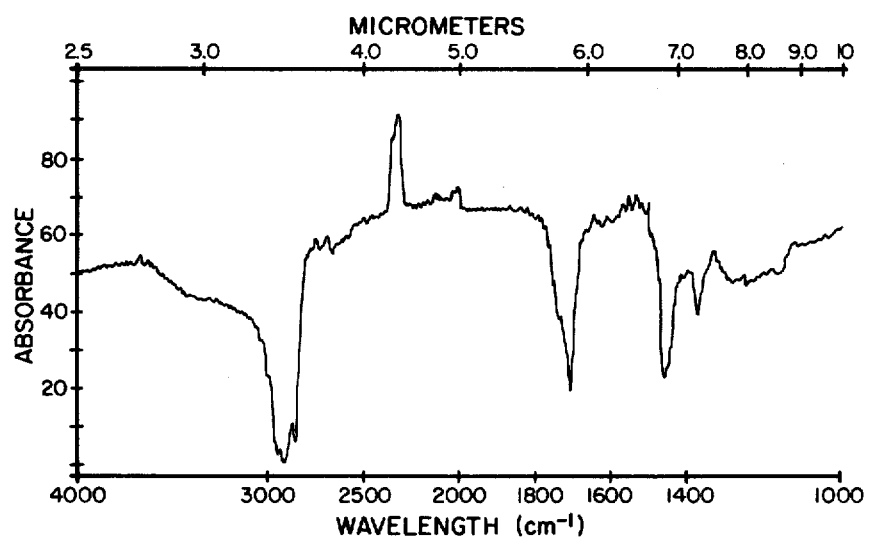
FIG. 2 shows the infra-red spectrum of the copper-free pigment of the invention.
Figure 3:
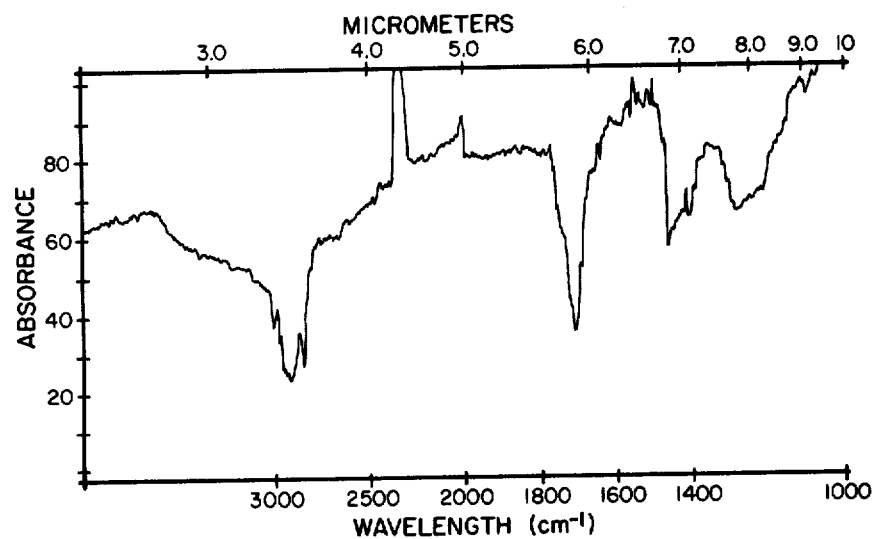
FIG. 3 shows the infra-red spectrum of the copper-containing pigment of the invention.

Infrared spectra were taken using a Beckman Infrared Spectrophotometer using a KBr pellet. The infrared spectrum of the copper-free pigment is shown in FIG. 2 and that of the copper-containing pigment is shown in FIG. 3.

E. Nuclear Magnetic Resonance Spectra

Figure 4:
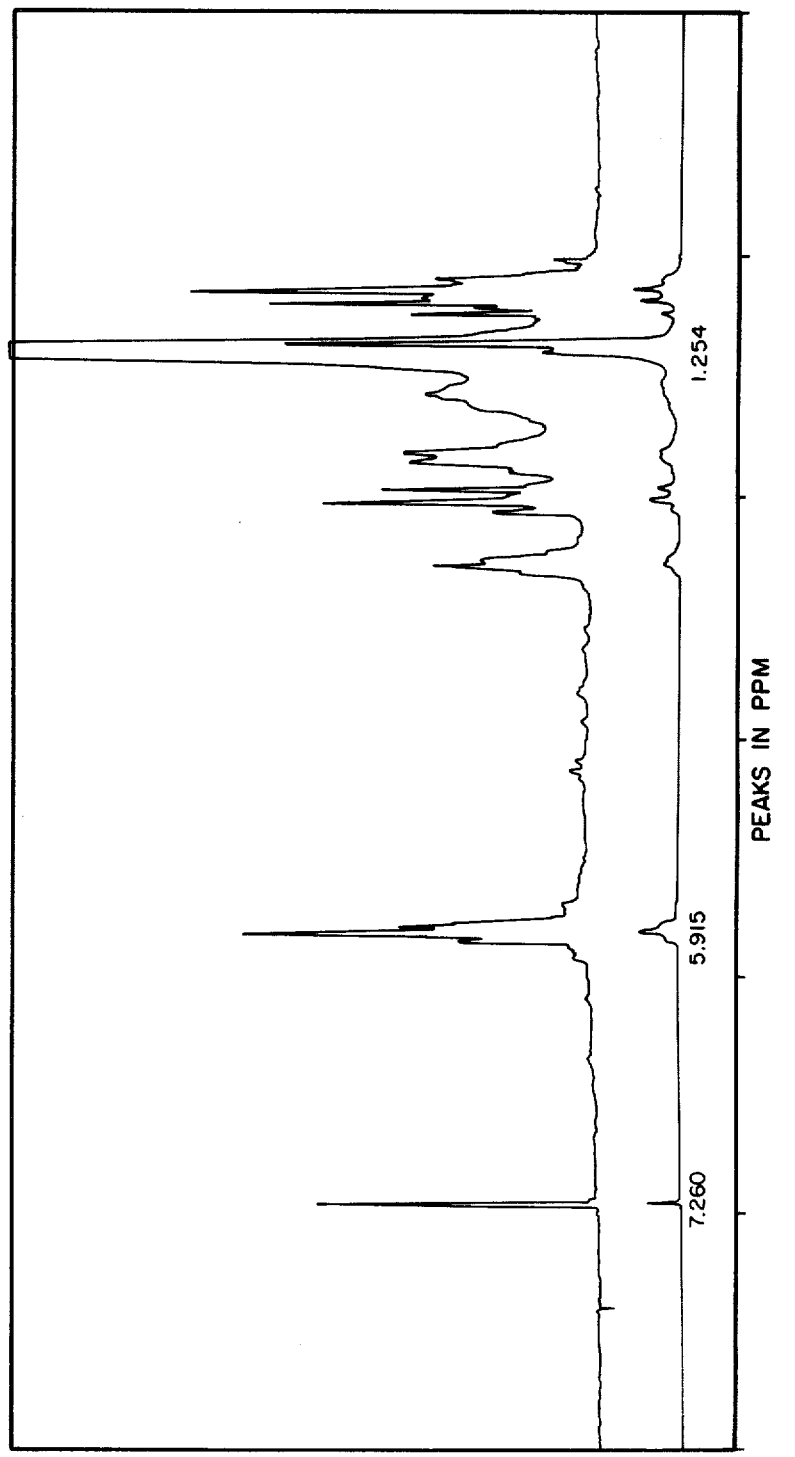
FIG. 4 shows the nuclear magnetic resonance spectrum of the copper-free pigment in deuterochloroform.
Figure 5:
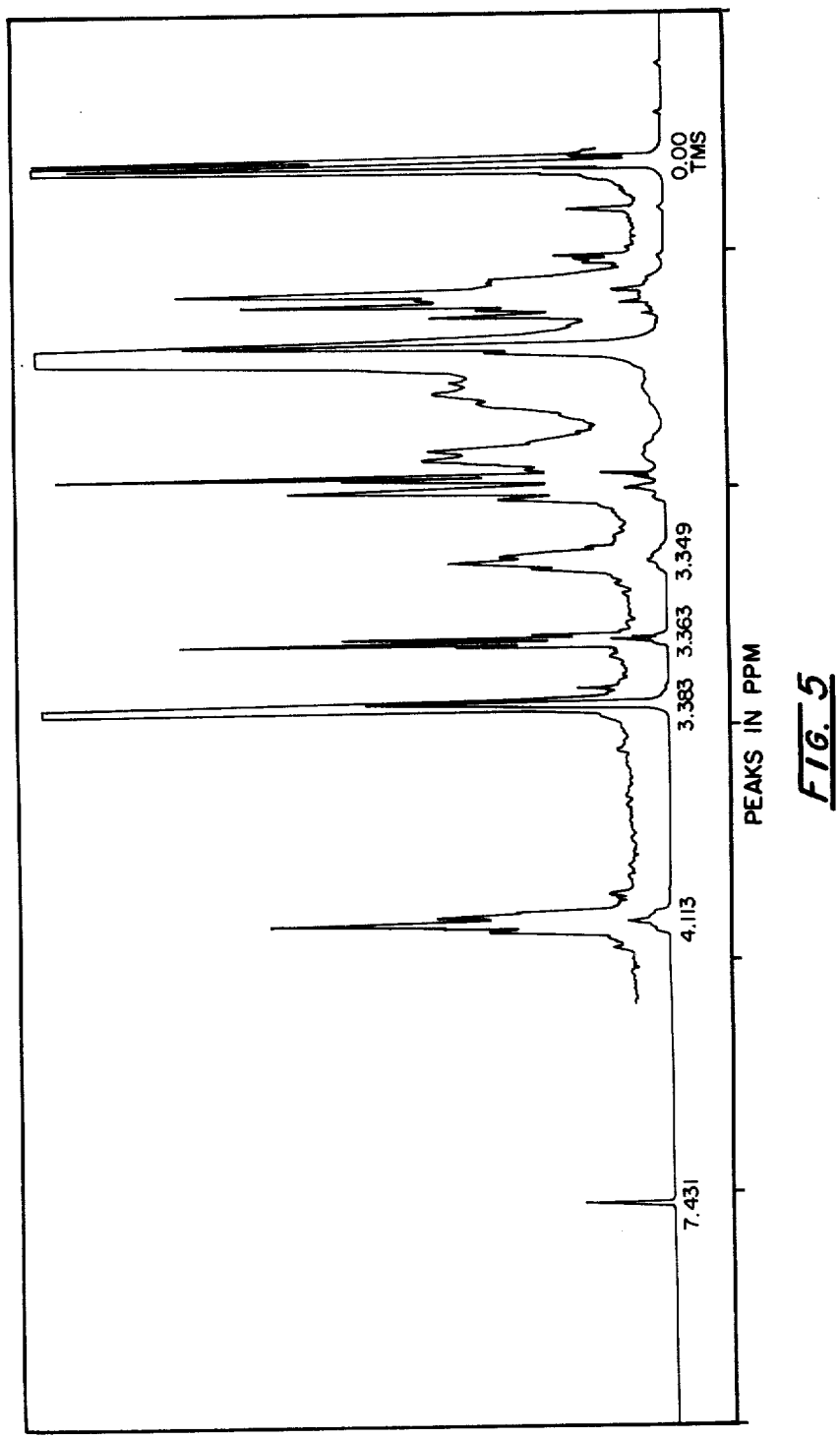
FIG. 5 shows the nuclear magnetic resonance spectrum of the copper-containing pigment in deuterochloroform.
Figure 6:
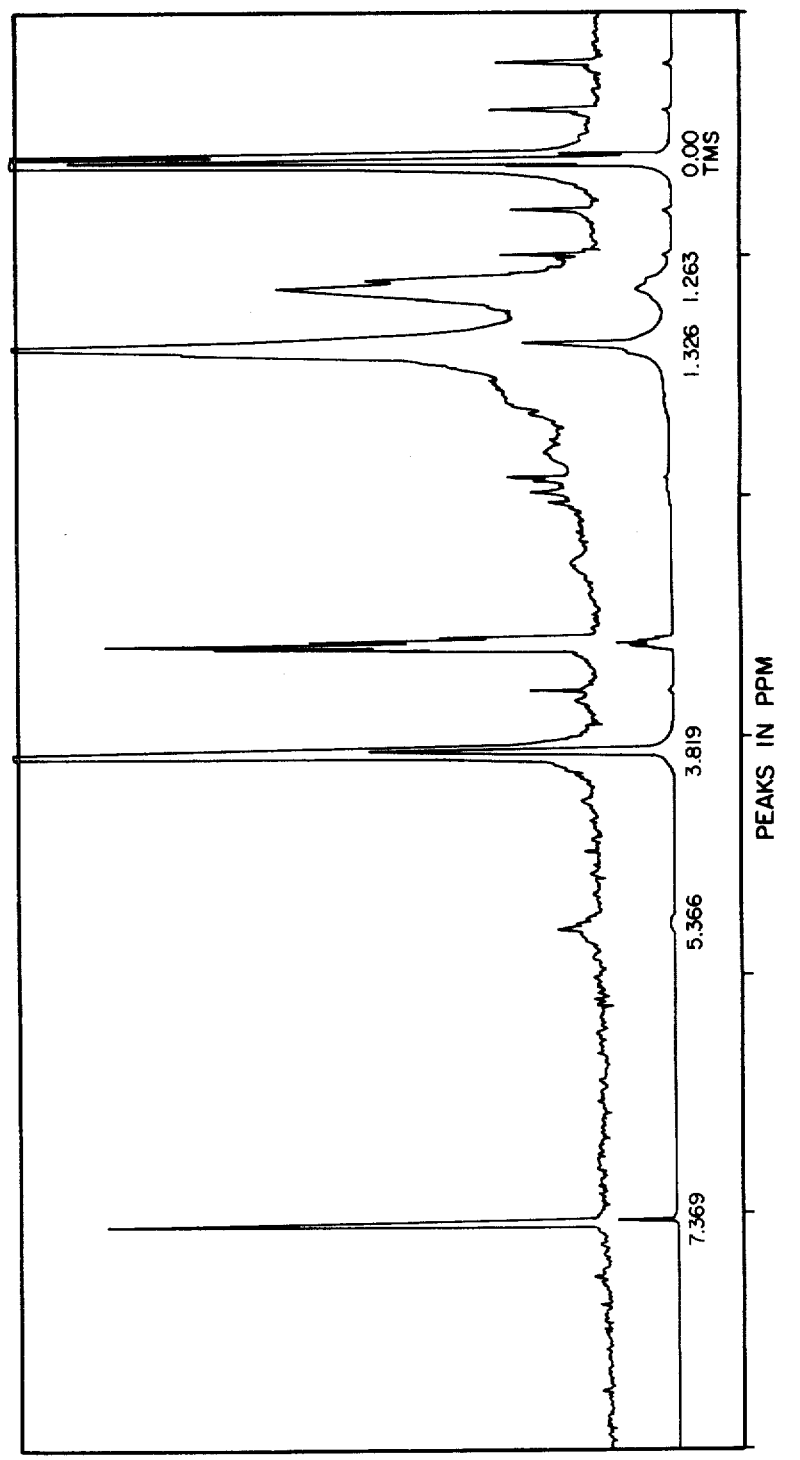
FIG. 6 shows the nuclear magnetic resonance of the copper-free pigment in a 25% tetradeuteromethanol/75% deuterochloroform mixture.
Figure 7:
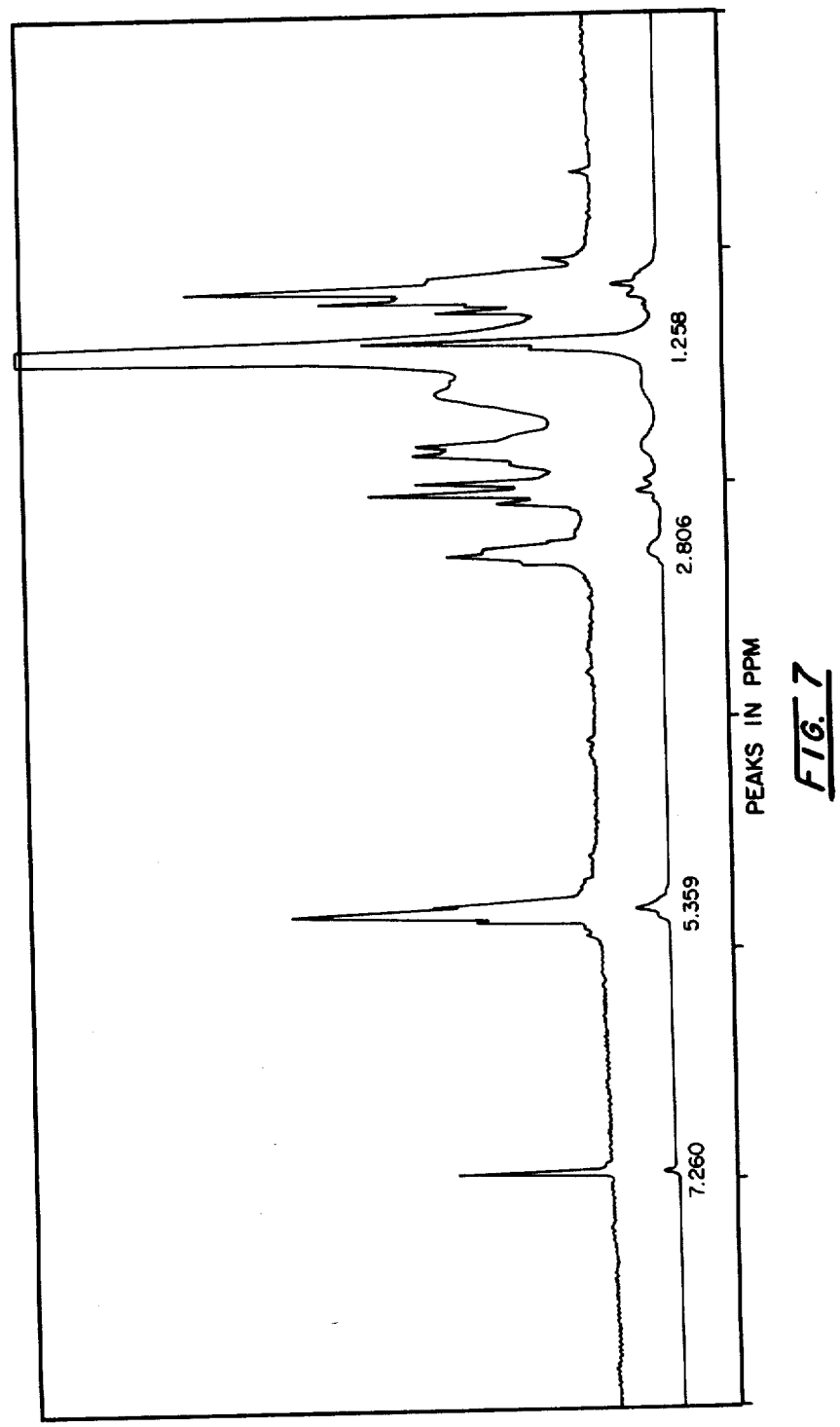
FIG. 7 shows the NMR spectrum of the copper-containing pigment in a 25% tetradeuteromethanol/75% deuterochloroform mixture.

Nuclear magnetic resonance proton spectra were taken in both 100% deuterochloroform and in a 25% tetradeuteromethanol/75% deuterochloroform mixture using a Brucker 90 Hz. Fourier Transform NMR Spectrometer at a concentration of about 0.3% w/v. Approximately 1% of tetramethylsilane was used as an internal standard. FIG. 4 shows the NMR spectrum of the copper-free pigment in 100% deuterochloroform, FIG. 5 shows the NMR spectrum of the copper-containing pigment in 100% deuterochloroform, FIG. 6 shows the NMR spectrum of the copper-free pigment in 25% tetradeuteromethanol/75% deuturochloroform and FIG. 7 shows the NMR spectrum of the copper-containing pigment in 25% tetradeuteromethanol/75% deuterochloroform.

F. Electron Spin Resonance Spectrum

Figure 8:
FIG. 8 shows the electron spin resonance spectrum of the copper-containing pigment at 77° K. in pyridine.

Since preliminary tests showed that the copper-containing pigment was paramagnetic, an electron spin resonance spectrum of this pigment was taken at 77° K. in pyridine. This spectrum is shown in FIG. 8.

G. Neutron Activation Analysis

Neutron activation analysis of both pigments was performed in the Ohio State University Research Reactor, a swimming pool type reactor using a 24 inch high active core in a pool of light water. The reactor's power rating was 10 KW and it had a thermal flux of $7 \times 10^{11}$ neutrons/cm$^2$/sec. The pigment samples were enclosed in polyethylene vials sealed with a friction sealer. After irradiation, the isotopes formed were monitored by a Gamma ray spectrometer comprising a Princeton Gamma-Tech lithium drifted germanium detector having an active volume of 60cm$^2$, a peak-to-Compton ratio of 46:1 and an energy resolution of 733eV full-width half-maximum at 121.9 KeV, a Canberra model 18180 multichannel analyzer and a PDP-11/05 minicomputer and associated software. Copper, magnesium and zinc were determined using comparison techniques, but all other data were obtained using absolute sample activity output calculations. The results are shown in Table 1 below.

TABLE 1

| | PIGMENT SAMPLE | | |
|---|---|---|---|
| | Starting Material | Copper-Free Pigment | Copper-Containing Pigment |
| TOTAL SAMPLE ELEMENTAL ANALYSIS | | | |
| SODIUM M/g | $6.22 \times 10^{-7}$ | $2.36 \times 10^{-7}$ | $4.41 \times 10^{-7}$ |
| CHLORINE M/g | $1.75 \times 10^{-7}$ | $3.30 \times 10^{-6}$ | $5.40 \times 10^{-6}$ |
| COPPER M/g | nil | nil | $1.48 \times 10^{-6}$ |
| CORRECTED FOR SALT ADDITION. | | | |
| SODIUM M/g | $4.47 \times 10^{-7}$ | 0 | 0 |
| CHLORINE M/g | 0 | $3.06 \times 10^{-6}$ | $4.96 \times 10^{-6}$ |
| COPPER M/g | nil | nil | $1.48 \times 10^{-6}$ |

The results of the above analyses showed that only two pigments were formed from the samples; those samples to which copper had been added produced a single copper-containing pigment, whereas the samples to which no copper was added produced a single copper-free pigment. The same pigments were produced from both peas and beans and from both blanched and conventionally canned beans. Both pigments were determined to be homogeneous by both sugar column and thin layer chromatography. This is somewhat surprising since green vegetables contain both chlorophyll a and chlorophyll b in a ratio of approximately 3:1. It is suggested (though the invention is in no way limited by this belief) that each of the pigments is either a complex or an inseparable mixture.

The two pigments can be distinguished from one another not only by the presence of copper in one and its absence from the other, but by means of their visible spectra. As clearly shown in FIG. 1, the visible spectrum of the copper-containing pigment is blue-shifted as compared with that of the copper-free pigment, thus causing the copper-containing pigment to be greener in color. In addition, the copper-containing pigment shows little fluorescence due to extinction, whereas the copper-free pigment shows a typical brilliant red fluorescence.

The analytical data given above and in the accompanying drawings show that the instant pigments are different from all pigments previously reported in the literature as derived from green vegetable coloring materials. Although the results of the various analyses are insufficient to define exactly the chemical nature of the two instant pigments, comparison with compounds described in the literature does enable certain features of the chemistry of the pigments to be identified.

The spectral data, especially the infra-red spectra show that the pigments belong to the chlorin or purpurin class. Comparison of the pigments' NMR spectra with the porphyrin NMR spectra described in the following three literature references:

I. Class, G. L., F. C. Pennington, M. R. Thomas, & H. H. Strain. 1963. Nuclear magnetic resonance spectra and molecular association of chlorophylls a+b, methyl chlorophyllides, pheophytins, and methyl pheophorbides, J. Amer. Chem. Soc. 85:3809-3821.

II. Vernon, L. P. & G. R. Seeley. 1966. "The Chlorophylls." Acad. Press. New York, N.Y. 679 pgs.

III. Smith, K. M. 1975. "Porphyrins and Metalloporphyrins." Elsevier Pub. Co. New York, N.Y. 910 pgs.

shows that the vinyl substituent was intact in both instant pigments and that, in the copper-containing pigment, the metal was chelated to the prophyrin ring because of the disappearance of the NH shift. The assignments of the lines on the NMR spectra shown in FIGS. 4–7 are shown in Table 2 below.

TABLE 2

| | Dissolved in 25% d$_4$ - Methanol & 75% CDCl$_3$ | | Dissolved in 100% CDCl$_3$ | |
|---|---|---|---|---|
| Assignment | Copper-Free Pigment | Copper-Containing Pigment | Copper-Free Pigment | Copper-Containing Pigment |
| NH | −.375 | — | — | — |
| NH | −.667 | — | — | — |
| COOH | −3.521 | −3.521 | −3.521 | −3.521 |
| CHCl$_3$ | 7.369 | 7.413 | 7.260 | 7.260 |
| vinyl | 5.366 | 4.113 | 5.363 | 5.359 |
| H$_2$O | 3.383 | 3.383 | — | — |
| Me ester | 3.354 | 3.349 | — | — |

The electron spin resonance spectrum of the copper-containing pigment showed that all nitrogens were equivalent as was expected in prophyrin metal chelate. The neutron activation results, when corrected for the presence of sodium chloride derived from the neutralized liquor, show a chlorine:copper atomic ratio of substantially 2:1 c.f.

IV. Woodward, R. B. and Karic, U. S., J. Am. Chem. Soc. 83, 4676-78 (1961).

Figure 9A:
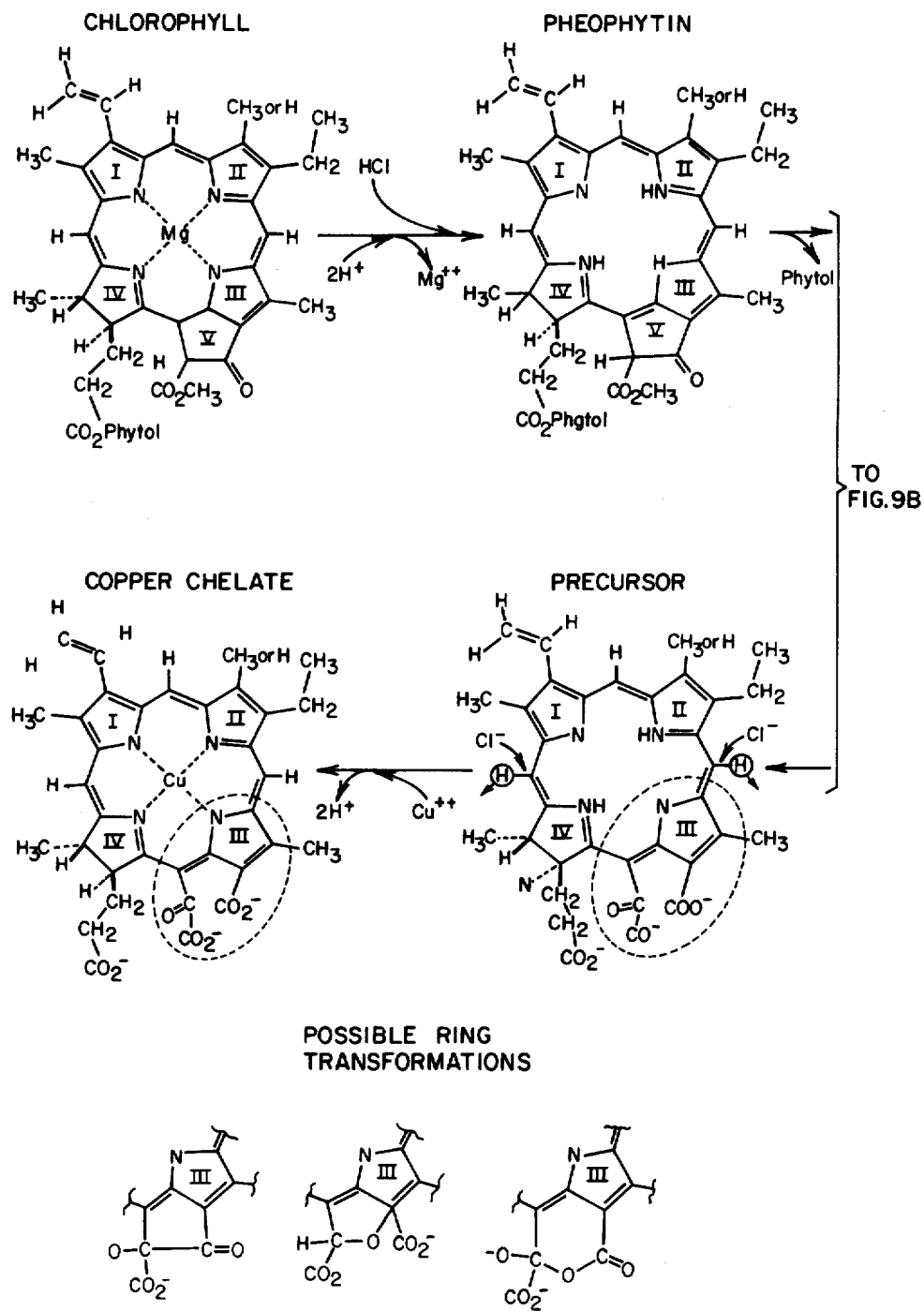
FIG. 9 shows the suggested chemical derivation of the copper-free and copper-containing pigments from chlorophyll.
Figure 9B:
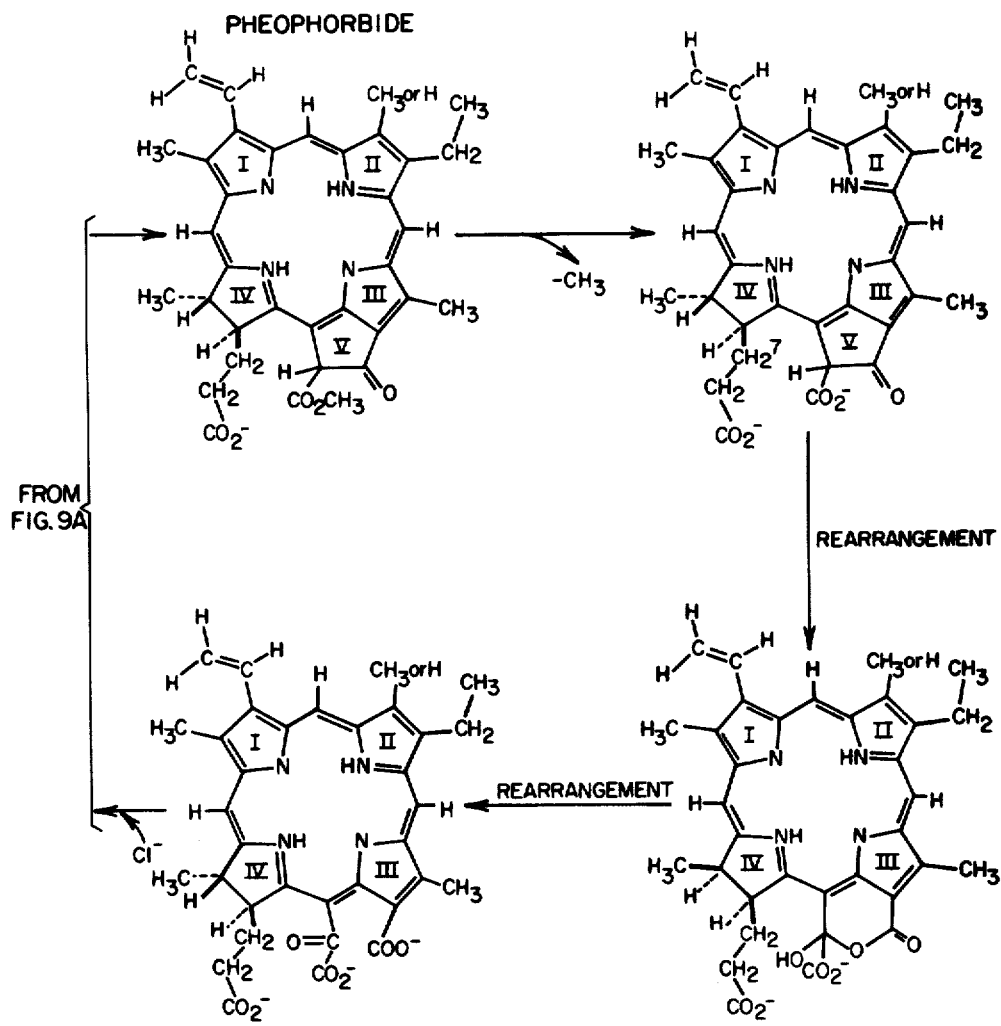

A tentative reaction scheme based upon the foregoing analytical data and showing possible alternative courses reaction is given in FIG. 9. However, it is again stressed that the scope of the invention is defined only in the appended claims and is not to be construed as limited by the additional data herein given, and particularly not by the tentative reaction scheme given in FIG. 9.

The NMR shifts at −3.521 show that the pigments both possess a COOH group, presumably at position 6 or 10. Methine protons were absent, apparently because of chlorine substitution by electrophilic attack at the δ and γ bridge positions, as reported in paper IV above.

This is consistent with the observed copper:chlorine ratio of 2.0±11%. Oxychlorin formation can be ruled out by the absence of an I.R. peak at 1580 cm$^{-1}$.

EXAMPLE II

This example illustrates the effect of the pH of the liquor on the storage of tomatoes.

A large quantity of tomatoes were washed with detergent and spray rinsed using water at 100 p.s.i.g. Half of the tomatoes were then processed into juice and the other pH of various portions of the juice was adjusted with hydrochloric acid to the desired values. Twenty pounds of tomatoes and twenty pounds of juice were added to each of a plurality of polyethylene bags, which were then vacuum-sealed and stored at room temperature. The bags were checked for spoilage at intervals of one week and if spoilage ocurred the bag was opened to eliminate bursting during gas formation. When bags were opened, attempts were made to identify the organisms responsible for the spoilage. At the end of one year, all previously unopened bags were opened and checked for spoilage. The results are shown in Table 3 below.

TABLE 3

| EQUILI-BRIUM pH | PERCENT OF SPOILAGE | AVERAGE TIME UNTIL SPOILAGE | ORGANISMS RESPONSIBLE FOR SPOILAGE |
|---|---|---|---|
| 2.00 | 100% | 1 WEEK | YEASTS, MOLD |
| 1.80 | 80% | 1 WEEK | YEASTS, MOLD |
| 1.60 | 75% | 1 WEEK | YEASTS |
| 1.40 | 50% | 1 MONTH | YEASTS |
| 1.35 | 5% | 1 MONTH | YEASTS |
| 1.30 | 0% | — | — |
| 1.25 | 0% | — | — |
| 1.10 | 0% | — | — |
| 1.05 | 0% | — | — |

The above results show that a pH of not more than 1.40 is needed for commercially-useful storage of tomatoes and that preferably the pH is not more than 1.35. In practice, it is not desirable to go below pH 1 since this results in excessive consumption of acid and, as the above results show, storage times of at least one year can be achieved using a pH of 1.05 or more.

EXAMPLE III

This example illustrates the effect of oxygen concentration on the storage of tomato juice.

Figure 10:
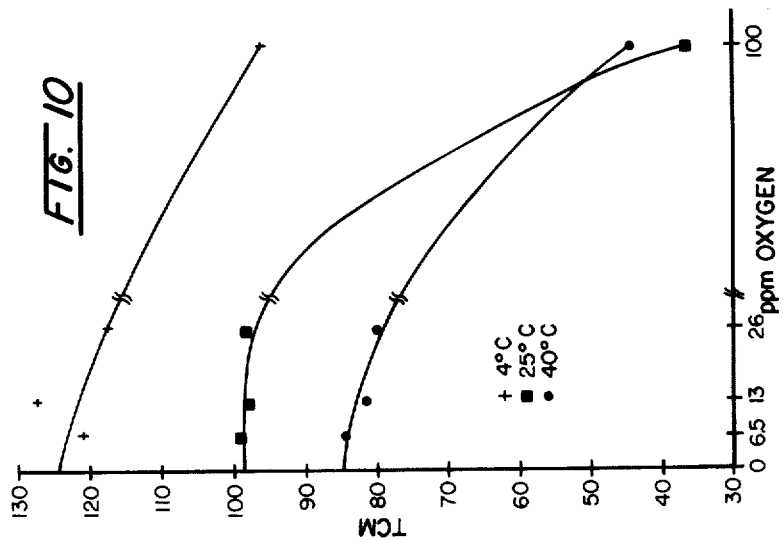
FIG. 10 shows the effect of oxygen concentration on the color of tomato juice stored by the method of the invention.

Tomato juice was prepared by the method described in Gould, W. A., W. S. Stone, H. Fenercioglu and S. Berry, Evaluation of tomato cultivars for processing, Ohio Agricultural Research Development Center Circular, 250:3-9 (1979) as far as the pasteurization step. The juice was then deaerated and acidified with 22 milliliters per liter of concentrated hydrochloric acid. Two hundred milliliter aliquots of the acidified juice were then added to plastic bags and the oxygen concentration in various samples of juice adjusted to 0, 6.5, 13, 26 and 100 parts per million. Bags were then stored at 4° C., 25° C. and 40° C. for four months. Three bags were stored for each oxygen concentration and each temperature. At the end of the storage, the tomato color measure (TCM) was determined by the method described in the aforementioned Gould, Stone, Fenercioglu and Berry paper. The results are shown in FIG. 10 of the accompanying drawings. It will be seen that, to avoid an undesirable decrease in the tomato color measure, it is desirable to keep the oxygen concentration to 26 parts per million or less. However, tomato juice is somewhat more susceptible to charge during storage than other horticultural products and thus other horticultural products may be stored at higher oxygen concentrations up to 100 parts per million.

Figure 11:
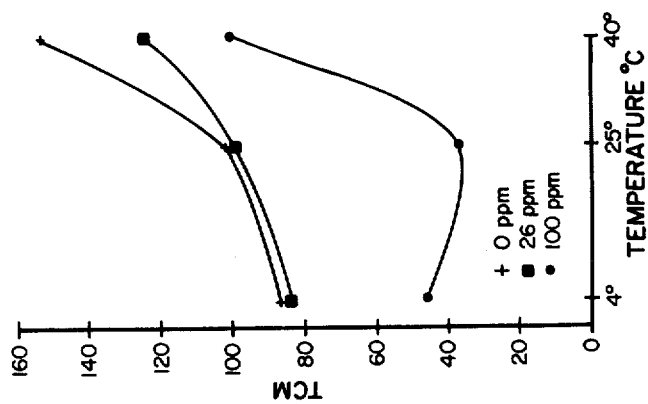
FIG. 11 shows the effect of temperature on the color of tomato juice stored by the method of the invention.

FIG. 11 shows the variation of the tomato color measure with temperature during these experiments. It will be seen that relatively little change in the color measure occurs provided the temperature does not exceed 25° C., but at 40° C. an undesirably large increase in tomato color measure occurs. Accordingly, the temperature of the horticultural products during storage should not exceed about 25° C.

EXAMPLE IV

This example shows the effects of various storage conditions on the storage of tomatoes.

Both raw washed tomatoes and tomatoes heat peeled by heating in water at 85° C. for one minute and removing the peel were used in these experiments. Both types of tomatoes were stored under cover solutions consisting of chopped and heated tomatoes, tomato juice prepared in the same manner as in Example III, and a 6% w/w solution of sucrose in distilled water. All cover solutions were acidified with 43.5 milliliter/liter of concentrated hydrochloric acid. As in Example III, storage was effected in plastic bags with exclusion of oxygen at temperatures of 4°, 25° or 40° C. for four months, three bags being used for each combination of tomato type and cover solution.

The experiments showed that the heat-peeled tomatoes had significantly improved texture as compared with the raw washed tomatoes; in addition, the heat-peeled tomatoes were rated as having better flavor in taste tests. While the choice of cover solution made little difference in the properties of the heat-peeled tomatoes, the color, flavor and texture of the raw washed tomatoes were significantly better using the 6% sucrose cover solution than when chopped tomatoes or tomato juice were used as the cover solutions. The effects of temperature on the properties of the stored tomatoes in this experiment were similar to those in Example III.

EXAMPLE V

This example illustrates the storage of stawberries by the method of the instant invention.

Strawberries were stored in vacuum-sealed polyethylene bags, with exclusion of oxygen, under an equal weight of unheated strawberry puree acidified with 30 milliliters/liter of concentrated hydrochloric acid for two months. 0.1 percent of CaHPO$_4$ was added to one half of the bags. The total weight of strawberries and cover puree in each bag was 910 grams.

After storage, the color of the product remained good, especially in the case of bags to which the calcium had been added, the red color of the strawberries to which calcium had been added being significantly better than that of the strawberries to which no calcium had been added. The flavor of the food was normal, but the fruit had become soft. It is of course well known that strawberries are very susceptible to softening during storage.

EXAMPLE VI

This example illustrates the storage of spinach by the method of the instant invention.

100 gram samples of New Zealand spinach were stored under 300 grams of distilled water acidified with 20 milliliters/liter of concentrated hydrochloric acid in polyethylene bags vacuum-sealed with exclusion of oxygen. The bags were opened after two months of storage at room temperature. Both blanched and unblanched samples of spinach were stored.

The color, flavor and texture of the stored spinach were good. The drained weight of the spinach was higher in the case of the stored unblanched spinach.

EXAMPLE VII

This example illustrates the storage of peas by the method of the instant invention.

200 gram samples of peas of the cultivars Sugar Gray Sugar, Sugar Snap and Wando were stored in both raw and blanched condition under an equal weight of distilled water acidified with 30 milliliters/liter of concentrated hydrochloric acid. Storage was effected in polyethylene bags under the same conditions as in the preceding example, and various samples were stored for two, three and four months at room temperature.

The appearance, flavor and texture of the cultivars Sugar Snap and Wando were good, the drained weight of the blanched peas being better than that of the unblanched peas, apparently because blanching reduced the loss of starch from the peas during storage. The cultivar Sugar Gray Sugar also showed good flavor and texture after storage, but unfortunately turned red.

EXAMPLE VIII

This example illustrates the storage of green and wax beans by the method of the instant invention.

227 gram samples of green beans of the cultivars Tendercrop, Stretch and Eagle and of wax beans of the cultivar Golden Red, in both blanched and unblanched condition were stored under the same conditions as in the preceding example.

After storage, the blanched beans showed good texture, though with some softening and some loss of flavor, though not to an unacceptable extent. The unblanched beans suffered from leaching of pectin from the beans and subsequent gelling of the pectin in the cover solution. Blanching was effective in stablizing the pectin and prevented the formation of gelled pectin within the cover solution.

EXAMPLE IX

This example illustrates the storage of cucumbers by the method of the instant invention.

Cucumbers were stored under acidified distilled watmilliliters per liter of concentrated hydrochloric acid and 0.1 $CaHPO_4$ was added to half the cucumbers, which were stored in polyethylene bags with exclusion of oxygen for three months.

The cucumbers stored under the calcium-containing liquor had acceptable taste and texture after storage, although some yellowing effect was produced in the interior of the cucumber. The cucumbers stored without calcium became soft and tended to break in pieces during storage. Small cucumbers stored better than large ones, since the large cucumbers experienced severe bloating.

EXAMPLE X

This example shows the storage of red beets by the method of the instant invention.

200 gram samples of red beets of the varities Formosa and Garnet Red were stored under an equal weight of distilled water acidified with 30 milliliters/liter of concentrated hydrochloric acid. Both blanched and unblanched samples of beets were stored in polyethylene bags with exclusion of oxygen for three months. The beets were stored in both whole and diced condition.

The color and texture of the beets stored whole was acceptable for both varieties; more color deterioration was observed in the case of the stored diced beets and blanching also decreased the color quality.

We claim:

1. A composition of matter comprising a green pigment derived from chlorophyll and substantially free from copper, said pigment being more soluble in petroleum ether than in acetone, having a $R_f$ value of about 0.0286 when developed with a 74% methanol: 20% acetone: 6% water mixture saturated with soybean oil using microcrystalline cellulose reversed phase thin layer chromatography and having the following spectroscopic characteristics:
   (a) visible peaks in either solution at about 410 and about 665 nm;
   (b) infra-red peaks at about 2920, about 2850, about 1710, about 1460 and about 1375 cm$^{-1}$, and
   (c) nuclear magnetic resonance peaks in 100% deuterochloroform at about $-3.521$, about 7.260 and about 5.363 parts per million relative to tetramethylsilane.

2. A composition of matter comprising a green, paramagnetic, copper-containing pigment derived from chlorophyll, said pigment being more soluble in petroleum ether than in acetone, stable in boiling 20% hydrochloric acid and stable to 50% aqueos sodium hydroxide solution, having an $R_f$ value of about 0.0091 when developed with a 74% methanol: 20% acetone: 6% water mixture saturated with soybean oil using microcrystalline cellulose reversed phase thin layer chromatography, and having the following spectroscopic characteristics:
   (a) visible peaks in ether solution at about 420 and about 644 nm;
   (b) infra-red peaks at about 2920, about 2850, about 1710, about 1460 and about 1410 cm$^{-1}$;
   (c) nuclear magnetic resonance peaks in 100% deuterochloroform at about $-3.521$, about 7.260 and about 5.359 parts per million relative to tetramethylsilane; and
   (d) electron spin resonance at about 3222 G at 77° K. in pyridine.

3. A method of preparing a green pigment substantially free from copper, which process comprises:
   storing an edible horticultural product containing chlorophyll but substantially free from copper in an acidic aqueous liquor at a temperature above freezing but not exceeding about room temperature, the pH of said liquor being sufficiently low and said storage conditions being adequately starved of molecular oxygen to retard spoilage of said stored product;
   at least partially neutralizing said stored product;
   heating said stored and neutralized product to produce said pigment therein;

extracting said pigment from said product with a non-polar solvent; and evaporating said non-polar solvent from said extract.

4. A method of preparing a green, copper-containing pigment, which method comprises:

storing an edible horticultural product containing chlorophyll in an acidic aqueous liquor at a temperature above freezing but not exceeding about room temperature, the pH of said liquor being sufficiently low and said storage conditions being adequately starved of molecular oxygen to retard spoilage of said stored product;

at least partially neutralizing said stored product;

adding copper to said stored and neutralized product if copper is not already contained therein;

heating said stored and neutralized product to produce said pigment therein;

extracting said pigment from said product with a non-polar solvent; and evaporating said non-polar solvent from said extract.

5. A method according to claim 3 or 4 wherein said pigment is extracted from said product with a semi-polar solvent, said semi-polar solvent extract is thereafter extracted with a non-polar solvent, and said non-polar solvent extract is separated from said semi-polar solvent extract.

6. A method according to claim 5 wherein said semi-polar solvent is acetone.

7. A method according to claim 3 or 4 wherein said non-polar solvent is petroleum ether.

8. A method according to claim 3 or 4 wherein said acidic aqueous liquor contains hydrochloric acid.

9. A method according to claim 3 or 4 wherein the level of molecular oxygen under said storage conditions does not substantially exceed about 25 ppm.

10. A method according to claim 3 or 4 wherein said edible horticultural product comprises green beans.

11. A method for the preservative storage of a solid edible horticultural product not previously subjected to a sterilization process selected from the group consisting of sterilization and pasteurization, which comprises:

storing said product for at least about one week in an acidic liquor having a pH not greater than about 2 and an oxygen concentration not exceeding about 100 parts per million at a temperature above freezing, but not exceeding about room temperature, the acidity and oxygen concentration of said liquor serving to retard spoilage of said stored product; and at least partially neutralizing said stored product at a temperature of above freezing but not exceeding about room temperature with a neutralizing agent at the termination of said storage to raise the pH of said stored product to an acceptable level for use of said stored product.

12. The method of claim 11 wherein said product is stored and neutralized at a temperature of between about 40° and 85° F.

13. The method of claim 12 wherein said storage temperature is between about 40° and 60° F.

14. The method of claim 12 wherein said neutralization temperature is between about 40° and 60° F.

15. The method of claim 11 wherein said acidic aqueous liquor contains an acid selected from the group consisting of hydrochloric acid, malic acid, a tartaric acid, lactic acid, gluconic acid, acetic acid, sulfuric acid, a phosphoric acid, citric acid, and mixtures thereof.

16. The method of claim 15 wherein said acid is hydrochloric acid.

17. The method of claim 11 wherein the level of molecular oxygen under said storage conditions does not substantially exceed about 25 ppm.

18. The method of claim 17 wherein the oxygen concentration does not substantially exceed about 10 ppm.

19. The method of claim 11 wherein any head space above said acidic aqueous liquor is filled with an inert gas or is under vacuum.

20. The method of claim 19 wherein said inert gas is nitrogen or carbon dioxide gas.

21. The method of claim 11 wherein said neutralizing agent is an alkali metal or alkaline earth metal hydroxide, oxide, carbonate, bicarbonate, sesquicarbonate, or mixtures thereof.

22. The method of claim 21 wherein said agent is sodium hydroxide.

23. The method of claim 21 where said alkaline earth metal is calcium.

24. The method of claim 23 wherein said agent is calcium hydroxide.

25. The method of claim 11 wherein said product is stored for a time not exeeding about one year.

26. The method of claim 11 wherein the density of said aqueous acidic liquor is controlled to be about the same or slightly higher than the density of said stored product for suppressing crushing of said product during said storage thereof.

27. The method of claim 11 wherein said product is stored in its as-picked natural form, in subdivided solid form or mixtures thereof.

28. The method of claim 1 wherein said edible horticultural product is selected from the group consisting of tomatoes, carrots, peas, corn, beans, potatoes, turnips, asparagus, apples, pears, peaches, and avocados.

29. A method of claim 28 wherein said product comprises tomatoes.

30. The method of claim 11 wherein the pH of said liquor is not greater than about 1.60.

31. The method of claim 29 wherein the pH of said liquor is not greater than about 1.40.

32. The method of claim 31 wherein said product comprises tomatoes and the pH of said liquor is from about 1.0 to about 1.35.

33. The method of claim 32 wherein the pH is between about 1.25 and 1.35.

34. The method of claim 29 wherein said neutralizing agent is sodium hydroxide and said acidic aqueous liquor contains hydrochloric acid.

35. A method for the preservative storage of tomatoes which comprises:

storing said tomatoes in an acidic aqueous liquor at a temperature of between about 40° and 85° F., the pH of said liquor being between about 1.0 and about 1.35 and the oxygen concentration being not substantially above about 25 ppm to retard spoilage of said stored tomatoes; and at least partially neutralizing said tomatoes at a temperature of between about 40°-85° F. with a neutralizing agent at the termination of said storage to raise the pH of said tomatoes to an acceptable level for use of said stored tomatoes.

36. The method of claim 35 wherein said acidic aqueous liquor is rendered acidic with hydrochloric acid and said neutralizing agent is sodium hydroxide.

37. The method of claim 35 wherein said tomatoes are stored for a time ranging from between about one week and about one year.

38. The method of claim 35 wherein the oxygen concentration does not substantially exceed about 10 ppm.

* * * * *